United States Patent
Schneider et al.

(10) Patent No.: US 11,226,467 B2
(45) Date of Patent: Jan. 18, 2022

(54) FOCUSING DEVICE

(71) Applicant: SICK AG, Waldkirch/Breisgau (DE)

(72) Inventors: Florian Schneider, Reute (DE); Georg Schäfer, Freiburg (DE); Jonathan Pfeil, Schallstadt (DE)

(73) Assignee: SICK AG, Waldkirch/Breisgau (DE)

( * ) Notice: Subject to any disclaimer, the term of this patent is extended or adjusted under 35 U.S.C. 154(b) by 161 days.

(21) Appl. No.: 16/701,851

(22) Filed: Dec. 3, 2019

(65) Prior Publication Data

US 2020/0174218 A1    Jun. 4, 2020

(30) Foreign Application Priority Data

Dec. 4, 2018  (EP) ..................................... 18210032

(51) Int. Cl.
  *G02B 7/04*    (2021.01)
  *G06K 7/14*    (2006.01)

(52) U.S. Cl.
  CPC .............. *G02B 7/04* (2013.01); *G06K 7/1439* (2013.01)

(58) Field of Classification Search
  CPC ... G02B 7/04; G02B 7/02; G02B 7/00; G06K 7/1439; G06K 7/1404
  USPC ......................................................... 359/823
  See application file for complete search history.

(56) References Cited

U.S. PATENT DOCUMENTS

| | | | |
|---|---|---|---|
| 4,615,585 A | 10/1986 | Van Sluys et al. | |
| 8,264,549 B2* | 9/2012 | Tokiwa | G02B 27/646 |
| | | | 348/208.11 |
| 8,711,236 B2* | 4/2014 | Shimizu | H04N 5/2253 |
| | | | 348/208.99 |
| 9,420,183 B2* | 8/2016 | Hwang | H02K 41/0356 |
| 10,126,521 B2 | 11/2018 | Ogino et al. | |
| 2010/0165132 A1 | 7/2010 | Tokiwa et al. | |
| 2013/0088609 A1* | 4/2013 | Shimizu | H04N 5/23258 |
| | | | 348/208.7 |
| 2014/0160311 A1* | 6/2014 | Hwang | H04N 5/23248 |
| | | | 348/208.99 |

FOREIGN PATENT DOCUMENTS

| | | |
|---|---|---|
| DE | 102016112123 A1 | 1/2018 |
| JP | 4761126 B2 | 8/2011 |

OTHER PUBLICATIONS

Search report dated Nov. 2, 2019, for corresponding European application 18210032.1.

* cited by examiner

*Primary Examiner* — William R Alexander
(74) *Attorney, Agent, or Firm* — Nath, Goldberg & Meyer; Jerald L. Meyer

(57) ABSTRACT

A focusing device for an optical system that has a carrier and an objective arranged thereat comprises a first guide section that is configured for fastening to the carrier or is designed in one piece therewith, a second guide section that forms a holder for the objective, at least one spring element that forms an elastic connection of the first guide section to the second guide section, and an actuator for adjusting the second guide section in and against an adjustment direction with respect to the first guide section, wherein the spring element is areal at least regionally. The spring element has at has one stiffening zone in which a first surface section of the spring element is bent over along a bending edge with respect to a second surface section of the spring element.

19 Claims, 3 Drawing Sheets

FOCUSING DEVICE

FIELD

The present invention relates to a focusing device for an optical system that has a carrier and an object arranged thereat, wherein the focusing device comprises: a first guide section that is configured for fastening to the carrier or is designed in one piece therewith;
 a second guide section that forms a holder for the objective;
 at least one spring element that forms an elastic connection of the first guide section to the second guide section; and
 an actuator for adjusting the second guide section with respect to the first guide section in and against an adjustment direction, wherein the at least one spring element is formed in an areal manner at least regionally.

BACKGROUND

Such focusing devices are used in sensors, scanners, and other optical system and in particular serve to adapt the distance of the object from a light reception surface. Focusing devices of the named kind are preferably adapted for autofocus operation. The carrier can in particular be a housing or a base frame of the optical system. The spring element can be designed as a leaf spring. A corresponding focusing device is disclosed in U.S. Pat. No. 4,615,585.

There is an endeavor to provide focusing devices having a long service life and a high adjustment speed. A corresponding mechanical resilience can, however, frequently only be achieved using complex designs and a high number of parts. This results in higher manufacturing costs.

There is therefore the need to provide a focusing device that has a long service life and high adjustment speeds despite low manufacturing costs.

SUMMARY

In accordance with the invention, the at least one spring element has at least one stiffening zone in which a first surface section of the spring element is bent over along a bending edge with respect to a second surface section of the spring element. Due to the bent-over surface section an increased mechanical stability of the spring element results in the stiffening zone from which an improved service life of the focusing device results. In addition, the spring stiffness can be adapted by the bending over of the surface section. The possibility results from the invention of reducing the material thickness of the spring element or of using a less expensive material to produce the spring element without compromises in stability.

In a focusing device in accordance with the invention, the two guide sections can form a parallel guide together with the connecting spring element. The elastic connection of the guide sections via the spring element can be a direct or an indirect connection depending on the application. This means that additional coupling elements can be provided. To further increase the stability and/or the spring stiffness of the at least one spring element, in addition to the first surface section at least one further surface section can be bent over along a bending edge with respect to the second surface section or to any other surface section of the spring element.

The actuator is preferably configured as an electromagnetic actuator. A moving coil actuator or an electric motor can, for example, be provided to adjust the second guide section with respect to the first guide section.

The spring element is preferably produced from a sheet metal part, preferably a single-layer sheet metal part. A sheet metal part can be manufactured particularly inexpensively and additionally only has a small weight. The spring element can in particular be produced from an etched sheet metal part.

In accordance with an embodiment of the invention, the bending edge extends transversely to the adjustment direction in an unloaded basic position of the spring element and/or obliquely to the adjustment direction in a loaded deflected position of the spring element. This is advantageous in that the stiffening is adapted to a main direction of load. Provision is preferably made that the bending edge has a straight-line extent and/or forms an outer edge of the spring element.

A further embodiment of the invention provides that the spring element has a perforation and/or a material weakening at the bending edge. This facilitates the positionally exact bending over of the first surface section and thus simplifies the production of the spring element. A perforation can be produced in a relatively simple manner by etching. It is furthermore possible to produce a material weakening at the bending edge by a partial etching through of the spring element.

The first guide section and the second guide section can each be designed as single-piece elements of metal or plastic. This results in a particularly simple and inexpensive design.

The spring element preferably has a base section that comprises the second surface section and that extends in a spring leaf plane extending transversely to the adjustment direction in an unloaded basic position of the spring element. The spring element can in particular be designed such that it extends in the spring leaf plane in an unloaded basic position apart from the bent-over first surface section and from possibly present further bent-over surface sections. On a linear adjustment of the second guide section with respect to the first guide section by means of the actuator, the spring element is slightly bent out of the spring leaf plane.

The spring element can be of frame shape to provide sufficient construction space for the arrangement of the objective.

Leadthroughs for fastening means can be provided in respective corner zones of the frame-like spring element. The leadthroughs can be manufactured in a simple manner by etching. The guide sections can be provided with threaded holes that are aligned with the leadthroughs of the frame-like spring element. The spring element can then be screwed in a simple manner to the first guide section and to the second guide section.

Provision is preferably made that the second guide section is arranged in a central cut-out of the frame-like spring element or extends into it. This design is particularly space saving.

The frame-like spring element can, for example, comprise two fastening bars and two connection bars, wherein the fastening bars each contact the guide sections at least substantially over the full area and/or the connection bars extend from one guide section to the other guide section. The stiffening zone of the spring element is preferably formed at one of the two connection bars. Both connection bars particularly preferably have at least one stiffening zone in each case having at least one bent-over surface section.

A further embodiment of the invention provides that the first guide section has a central leadthrough and that the second guide section is arranged in the central leadthrough or extends into it. This design only takes up a little construction space. The first guide section is preferably of frame shape.

In accordance with a further embodiment of the invention, the first surface section is bent over by at least 70° and by at most 100°, in particular by approximately 90°, with respect to the second surface section. A particularly pronounced stiffening effect is thereby achieved.

A special embodiment provides that a third surface section of the spring element is likewise bent over, preferably in the same direction, by at least 70° and by at most 100°, in particular by approximately 90', with respect to the second surface section. The stability of the spring element is hereby further increased. A particularly high spring stiffness additionally results.

The first surface section and the third surface section can be provided at oppositely disposed longitudinal sides of a strip-shaped section of the spring element forming the second surface section, in particular such that the strip-shaped section has a U-shaped cross-section. A pronounced stability increase can be achieved in a fast and simple manner by producing a corresponding outline. The first surface section and the third surface section are preferably only provided in a central partial zone of the strip-shaped section. The end sections preferably remain free of surface sections bent over at right angles so that they can be screwed to the guide sections without problem. The first surface section and the third surface section can in particular be provided at oppositely disposed longitudinal sides of a connection bar as described above.

The spring element can have a further strip-shaped section, with fourth and fifth surface sections of the spring element each being bent over with respect to a base plane of the further strip-shaped section by at least 70° and by at most 100°, in particular by approximately 90°, at oppositely disposed longitudinal sides of the further strip-shaped section. This design is accompanied by a particularly high stability. The strip-shaped sections are preferably arranged at opposite sides of the spring element and/or extend in parallel with one another. The strip-shaped sections can form connection bars that extend from one guide section to the other guide section.

At least one reinforcement surface section of the spring element can be bent over by 180° with respect to a base surface section, in particular such that a double-layer section results. The spring element can therefore comprise a completely folded over surface section that further increases the stability. The reinforcement surface section can be elongate and can extend transversely to the adjustment direction. The stiffening zone can furthermore be elongate and can extend transversely to the elongate reinforcement surface section.

The spring element is preferably fastened to the first guide section or to the second guide section in the region of the reinforcement surface section. An excessive material strain in the region of the fastening is thereby countered. To enable a corresponding fastening of the spring element, leadthroughs for fastening means such as screws can pass through the double-layer zone. The spring element preferably comprises two oppositely disposed double-layer sections to ensure an improved fastening of the spring element at both guide sections.

In a frame-like design of the spring element, reinforcement surface sections such as described above are preferably provided at two oppositely disposed frame sides, whereas stiffening zones as described above are provided at the two other oppositely disposed frame sides. On a configuration of the spring element with two fastening bars and two connection bars, corresponding surface sections can in particular be provided at the fastening bars and/or corresponding reinforcement stiffening zones can be provided at the connection bars.

In accordance with a further embodiment of the invention, at least two spring elements that are formed areally at least regionally are provided for the elastic connection of the first guide section to the second guide section and each have a stiffening zone in which a first surface section is bent over along a bending edge with respect to a second surface section, with the spring elements extending spaced apart from one another in parallel. In this embodiment, the objective held in the second guide section is guided particularly reliably. The two parallel spring elements can in particular be designed as described above. The two spring elements are preferably of the same design. If required, more than two spring elements that extend spaced apart from one another in parallel can also be provided for the elastic connection of the guide sections.

The spring elements can be attached at opposite end faces of the first guide section and/or of the second guide section. This results in a particularly compact manner of construction.

The invention also relates to an optical sensor, in particular a code reader, having a light transmitter for transmitting transmitted light beams and/or having a light receiver for receiving received light beams, having an objective as a converging optics for the transmitted light beams and/or for the received light beams, and having a focusing device for adjusting the objective.

In accordance with the invention, the focusing device of the optical sensor is configured as described above, with the first guide section being fastened to a carrier of the optical sensor or being formed in one piece therewith and with the objective being held in the second guide section.

Optical sensors are used in many areas of industry for monitoring, securing, and for information recording. Code readers such as barcode scanners or camera systems serve, in particular in logistics and in automatic production, to read information included in a code. For this purpose, the code reader can be mounted in a stationary manner at a conveyor belt on which objects bearing a code are conveyed past the code reader. Such systems generally have to be able to reliably read the codes in a relatively large depth of field range. For this purpose, the focusing device sets the laser beam of the barcode scanner or the focal plane of the objective to the corresponding distance value. It is difficult to design a focusing device such that it has a long service life, enables high adjustment speeds, and can simultaneously be produced inexpensively.

The above-named demands can be simultaneously satisfied by a parallel guidance by an areal spring element that is regionally stiffened by a local bending over of a surface section.

The design of a focusing device in accordance with the invention is suitable to a high degree for optical code readers, but generally also for other optical systems such as digital cameras.

Further developments of the invention can also be seen from the dependent claims, from the description and from the enclosed drawings.

The invention will be described in the following by way of example with reference to the drawings.

DETAILED DESCRIPTION

Figure 1:
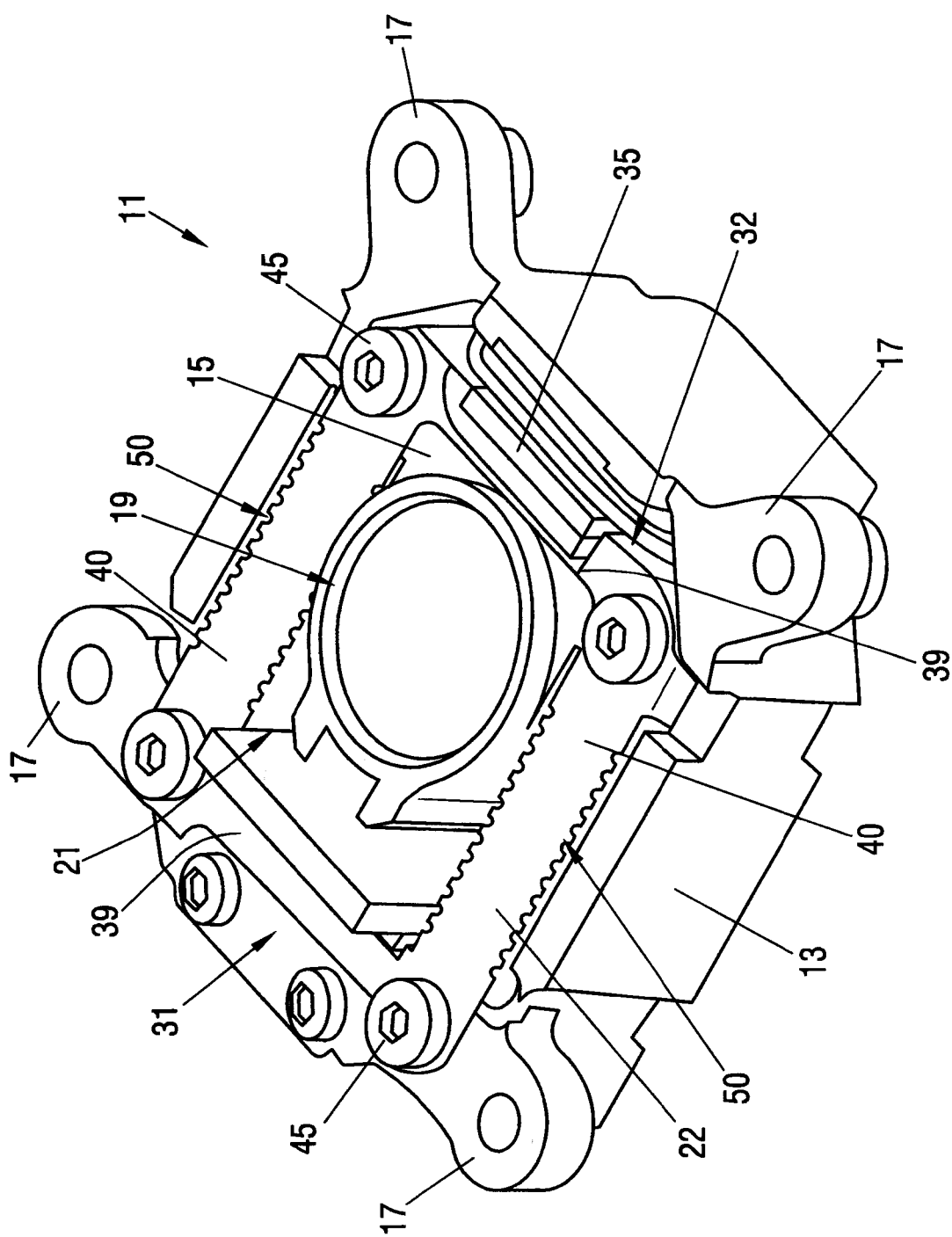
FIG. 1 is a perspective view of a focusing device in accordance with the invention for a code reader in accordance with the invention.
Figure 2:
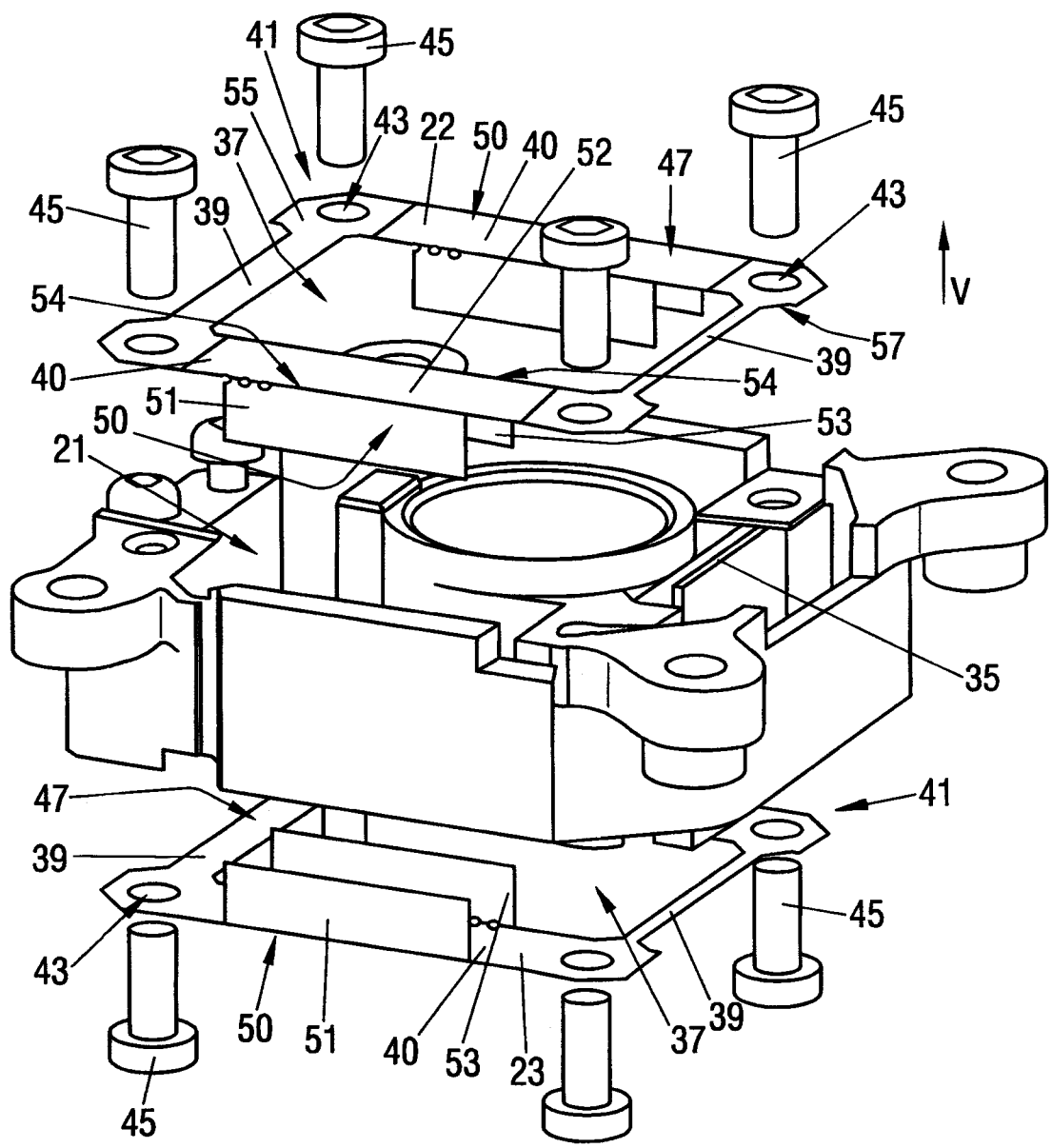
FIG. 2 is an exploded representation of the focusing device shown in FIG. 1.

The focusing device 11 shown in FIGS. 1 and 2 and designed in accordance with an embodiment of the invention comprises a first guide section 13 and a second guide section 15 that are preferably designed as single-piece elements of metal or plastic, for example as injection molded parts. The first guide section 13 is configured for fastening to the carrier of an optical system, not shown, such as a code reader, and is provided with fastening lugs 17 for this purpose. The first guide section 13 could generally also be designed in one piece with such a carrier. A holder 19 for an objective, not shown, is formed at the second guide section 15. As shown, the first guide section 13 is of frame shape and has a central leadthrough 21 in which the second guide section 15 is arranged.

The guide sections 13, 15 are elastically connected to one another via an arrangement of two areal spring elements 22, 23 (FIG. 2). The two areal spring elements 22, 23 are each screwed by means of screws 45 in the region of a first end 31 to the first guide section 13 and in the region of an opposite second end 32 to the second guide section 15. They extend spaced apart from one another in parallel and form a parallel guide for the objective received in the holder 19 together with the guide sections 13, 15.

An only schematically shown actuator 35, here in the form of a moving coil actuator of a generally known design, serves for the adjustment of the second guide section 15 with respect to the first guide section 13 in and against an adjustment direction V in dependence on control signals to thus adapt the focal point position of the objective relative to an image sensor, not shown.

The spring elements 22, 23 are of frame shape and each have a central cutout 37 that is aligned with the leadthrough 21 of the first guide section 13. The spring elements 22, 23 specifically each have two fastening bars 39 and two connection bars 40, wherein the fastening bars 39 each contact the guide sections 13, 15 over the full area and the connection bars 40 each extend from one guide section 13 to the other guide section 15. Leadthroughs 43 for the screws 45 are provided in the corner zones 41 of the spring elements 22, 23.

As can be recognized in FIG. 2, the fastening bars 39 and the connection bars 40 each form a base section 47 of the associated spring element 22, 23 that defines a spring leaf plane extending at right angles to the adjustment direction V.

Each of the spring elements 22, 23 has stiffening zones 50 in respective central zones of the connection bars 40. The stiffening zones 50 preferably extend over at least 25% and at most over 80% of the longitudinal extent of the connection bars 40.

A respective first surface section 51 is bent over along a straight-line bending edge 54 with respect to a second surface section 54 belonging to the base section 47 in the stiffening zones 50. A third surface section 35 is furthermore bent over along a further straight-line bending edge 54 with respect to the second surface section 52. In the embodiment shown, the first surface section 51 and the third surface section 53 are each bent over by 90° with respect to the second surface section 52 so that a respective U-shaped cross-section results for the connection points 40 in the stiffness zone 50. As can be recognized in FIG. 2, the spring elements 22, 23 are fastened to the guide sections 13, 15 such that the bent-over surface sections 51, 53 of the different spring elements 22, 23 face toward one another.

The fastening bars 39 are double-layered to enable a more stable attachment of the spring elements 22, 23 to the guide sections 13, 15. The double-layer zones are each produced by bending over a reinforcement surface section 55 (FIG. 3) by 180° with respect to a base surface section 57 of the base section 47.

Figure 3:
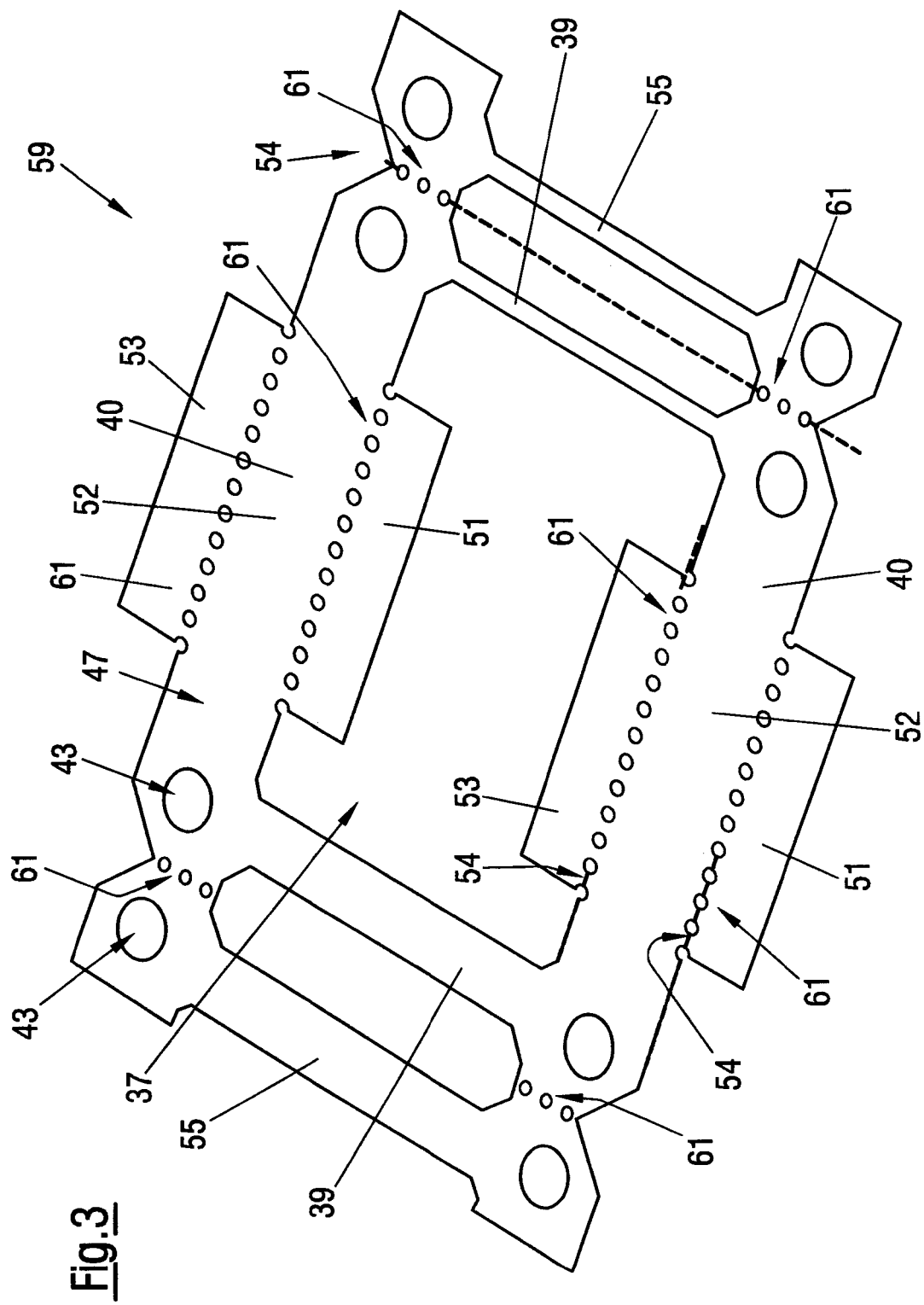
FIG. 3 shows a spring element of the focusing device shown in FIG. 1 in a non-processed starting state.

The manufacture of the spring elements 22, 23 will be described in the following with reference to FIG. 3 that shows a single-layer sheet metal part 59 as the starting element for a spring element 22, 23 (FIG. 2). The first surface sections 51, the third surface sections 53, and the reinforcement surface sections 55 are still not bent over with respect to the base section 47. Corresponding perforations 61 are provided to define the bending edges 54. The perforations 61 can be produced by etching.

To produce a spring element 22, 23, the first surface sections 51 and the second surface sections 53 are bent over by 90°, while the reinforcement surface sections 55 are bent over by 180°. The first surface sections 51 and third surface sections 53 bent over by 90° effect a stiffening in the central zone of the connection bars 40 that improves the spring stiffness and the stability. The reinforcement surface sections 55 bent over by 180° effect an increased stability in the fastening zone.

A reliable and durable guide for the objective to be adjusted results from the regionally stiffened and reinforced spring elements 22, 23 despite comparatively low manufacturing costs. A focusing device 11 in accordance with the invention is suitable for any desired optical systems having a focal adjustment, in particular for optical code readers.

REFERENCE NUMERAL LIST 11 focusing device
13 first guide section
15 second guide section
17 fastening lug
19 holder
21 central leadthrough
22 spring element
23 spring element
31 first end
32 second end
35 actuator
37 central cutout
39 fastening bar
40 connection bar
41 corner zone
43 leadthrough
45 screw
47 base section
50 stiffening zone
51 first surface section
52 second surface section
53 third surface section
54 bending edge
55 reinforcement surface section
57 base surface section
59 sheet metal part
61 perforation
V adjustment direction

The invention claimed is:

1. A focusing device for an optical system that has a carrier and an objective arranged thereat, wherein the focusing device comprises:
   a first guide section that is configured for fastening to the carrier or is designed in one piece therewith;
   a second guide section that forms a holder for the objective;
   at least one spring element that forms an elastic connection of the first guide section to the second guide section; and
   an actuator for adjusting the second guide section in and against an adjustment direction with respect to the first guide section,
   wherein the at least one spring element is areal at least regionally,
   wherein the at least one spring element has at least one stiffening zone in which a first surface section of the spring element is bent over along a bending edge with respect to a second surface section of the spring element,
   and wherein the spring element has at least one of a perforation and a material weakening at the bending edge.

2. The focusing device in accordance with claim 1, wherein the spring element is produced from a sheet metal part.

3. The focusing device in accordance with claim 1, wherein the bending edge extends transversely to the adjustment direction in an unloaded base position of the spring element.

4. The focusing device in accordance with claim 1, wherein the first guide section and the second guide section are each designed as a single-piece element of metal or plastic.

5. The focusing device in accordance with claim 1, wherein the spring element has a base section that comprises the second surface section and that extends in a spring leaf plane extending transversely to the adjustment direction in an unloaded basic position of the spring element.

6. The focusing device in accordance with claim 1, wherein the spring element is of frame shape.

7. The focusing device in accordance with claim 6, further comprising leadthroughs for fastening means in respective corner zones of the frame-like spring element.

8. The focusing device in accordance with claim 6, wherein the second guide section is arranged in a central cutout of the frame-like spring element or extends into it.

9. The focusing device in accordance with claim 1, wherein the first surface section is bent over by at least 70° and by at most 100° with respect to the second surface section.

10. The focusing device in accordance with claim 9, wherein a third surface section of the spring element is likewise bent over by at least 70° and by at most 100° with respect to the second surface section.

11. The focusing device in accordance with claim 10, wherein the first surface section and the third surface section are provided at oppositely disposed longitudinal sides of a strip-shaped section of the spring element forming the second surface section.

12. The focusing device in accordance with claim 11, wherein the spring element has a further strip-shaped section, with fourth and fifth surface sections of the spring element each being bent over by at least 70° and by at most 100° with respect to a base plane of the further strip-shaped section at oppositely disposed longitudinal sides of the further strip-shaped section.

13. The focusing device in accordance with claim 1, wherein at least one reinforcement surface section of the spring element is bent over by 180° with respect to a base surface section.

14. The focusing device in accordance with claim 13, wherein the spring element is fastened to the first guide section or to the second guide section in the region of the reinforcement surface section.

15. The focusing device in accordance with claim 1, wherein at least two spring elements that are formed areally at least regionally are provided for the elastic connection of the first guide section to the second guide section and each have a stiffening zone in which a first surface section is bent over along a bending edge with respect to a second surface section, with the spring elements extending spaced apart from one another in parallel.

16. The focusing device in accordance with claim 15, wherein the spring elements are attached at opposite end faces of the first guide section and/or of the second guide section.

17. A focusing device for an optical system that has a carrier and an objective arranged thereat, wherein the focusing device comprises:
   a first guide section that is configured for fastening to the carrier or is designed in one piece therewith;
   a second guide section that forms a holder for the objective;
   at least one spring element that forms an elastic connection of the first guide section to the second guide section; and
   an actuator for adjusting the second guide section in and against an adjustment direction with respect to the first guide section,
   wherein the at least one spring element is areal at least regionally,
wherein the at least one spring element has at least one stiffening zone in which a first surface section of the spring element is bent over along a bending edge with respect to a second surface sect ono the spring element,
   and wherein the first guide section has a central leadthrough and the second guide section is arranged in the central leadthrough or extends into it.

18. An optical sensor having a light transmitter for transmitting transmitted light beams and/or having a light receiver for receiving received light beams, having an objective as a converging optics for the transmitted light beams and/or for the received light beams, and having a focusing device for adjusting the objective,
   wherein the focusing device has a carrier and an objective arranged thereat and comprises:
   a first guide section;
   a second guide section; and
   an actuator for adjusting the second guide section in and against an adjustment direction with respect to the first guide section,
   wherein the at least one spring element is areal at least regionally,
   wherein the at least one spring element has at least one stiffening zone in which a first surface section of the spring element is bent over along a bending edge with respect to a second surface section of the spring element, with the first guide section being fastened to a carrier of the optical sensor or being formed in one piece therewith and with the objective being held in the second guide section, and wherein the spring element has at least one of a perforation and a material weakening at the bending edge.

19. The optical sensor in accordance with claim 18, wherein the spring element has a base section that comprises the second surface section and that extends in a spring leaf plane extending transversely to the adjustment direction in an unloaded basic position of the spring element.

\* \* \* \* \*